(12) United States Patent
Cummins et al.

(10) Patent No.: US 7,386,807 B2
(45) Date of Patent: Jun. 10, 2008

(54) SYSTEM AND METHOD FOR MONITORING APPLICATION RESPONSE AND PROVIDING VISUAL TREATMENT

(75) Inventors: Charles Cummins, Seattle, WA (US); Kanwai VedBrat, Seattle, WA (US); Reiner Fink, Mercer Island, WA (US); Lyon K. F. Wong, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 614 days.

(21) Appl. No.: 10/846,578

(22) Filed: May 17, 2004

(65) Prior Publication Data
US 2005/0257168 A1 Nov. 17, 2005

(51) Int. Cl.
*G06F 3/048* (2006.01)
*G06F 3/01* (2006.01)

(52) U.S. Cl. .............. 715/797; 715/790; 715/791; 715/796; 715/809

(58) Field of Classification Search ............... 715/759, 715/764, 766, 768, 767, 772, 779, 790, 793, 715/794–797, 791, 781
See application file for complete search history.

(56) References Cited

U.S. PATENT DOCUMENTS

| | | | | |
|---|---|---|---|---|
| 5,075,675 A | * | 12/1991 | Barker et al. | 715/794 |
| 5,363,483 A | * | 11/1994 | Jones et al. | 715/766 |
| 5,455,904 A | * | 10/1995 | Bouchet et al. | 715/798 |
| 5,499,334 A | * | 3/1996 | Staab | 715/778 |
| 5,515,493 A | * | 5/1996 | Boston et al. | 715/807 |
| 5,815,702 A | * | 9/1998 | Kannan et al. | 712/244 |
| 5,859,639 A | * | 1/1999 | Ebrahim | 715/788 |
| 5,911,060 A | * | 6/1999 | Elliott | 718/100 |
| 6,009,258 A | * | 12/1999 | Elliott | 703/22 |
| 6,009,440 A | * | 12/1999 | Watson et al. | 707/203 |
| 6,026,362 A | * | 2/2000 | Kim et al. | 705/1 |
| 6,118,451 A | * | 9/2000 | Alexander | 715/809 |
| 6,230,286 B1 | * | 5/2001 | Shapiro et al. | 714/23 |
| 6,239,796 B1 | * | 5/2001 | Alexander | 715/809 |
| 6,314,532 B1 | * | 11/2001 | Daudelin et al. | 714/38 |
| 6,407,759 B1 | * | 6/2002 | Kanungo et al. | 715/809 |
| 6,438,709 B2 | * | 8/2002 | Poisner | 714/23 |
| 6,459,440 B1 | * | 10/2002 | Monnes et al. | 715/808 |
| 6,567,937 B1 | * | 5/2003 | Flores et al. | 714/46 |
| 6,630,946 B2 | * | 10/2003 | Elliott et al. | 715/781 |
| 6,701,454 B1 | * | 3/2004 | Fischer et al. | 714/15 |
| 6,801,230 B2 | * | 10/2004 | Driskell | 715/854 |
| 6,850,257 B1 | * | 2/2005 | Colleran et al. | 715/804 |
| 6,874,125 B1 | * | 3/2005 | Carroll et al. | 715/705 |

(Continued)

*Primary Examiner*—Weilun Lo
*Assistant Examiner*—Steven B. Theriault
(74) *Attorney, Agent, or Firm*—Shook, Hardy & Bacon, L.L.P.

(57) ABSTRACT

A system and method are provided for determining the status of an application and altering the corresponding application window if necessary in order to convey information to the user and improve the user experience. The system and method of the invention allow visual treatment to be applied to a last active state of an application. The system and method further detect hidden dialogs that are shown in response to an application closing or exit request. The system and method additionally trap applications that respond to messages but ignore close commands and detect applications that do not provide visual feedback in response to user requests to close. Through these functions, a user is able to more readily distinguish between a non-responsive application and an improperly functioning application window.

24 Claims, 6 Drawing Sheets

U.S. PATENT DOCUMENTS

| | | | |
|---|---|---|---|
| 6,915,449 B2* | 7/2005 | Bantz et al. | 714/15 |
| 7,019,757 B2* | 3/2006 | Brown et al. | 345/592 |
| 7,028,056 B1* | 4/2006 | Hendel et al. | 707/202 |
| 7,039,872 B1* | 5/2006 | Raheman | 715/748 |
| 7,047,533 B2* | 5/2006 | Circenis | 719/318 |
| 7,149,928 B2* | 12/2006 | van Os | 714/38 |
| 7,207,047 B2* | 4/2007 | Subramanian et al. | 719/313 |
| 7,219,264 B2* | 5/2007 | Pail et al. | 714/23 |
| 2002/0152228 A1* | 10/2002 | Lopez et al. | 707/202 |
| 2002/0162053 A1* | 10/2002 | Os | 714/38 |
| 2003/0007004 A1* | 1/2003 | Kanungo et al. | 345/762 |
| 2003/0112278 A1* | 6/2003 | Driskell | 345/788 |
| 2003/0142137 A1* | 7/2003 | Brown et al. | 345/786 |
| 2003/0142140 A1* | 7/2003 | Brown et al. | 345/803 |
| 2004/0056900 A1* | 3/2004 | Blume | 345/807 |
| 2004/0078734 A1* | 4/2004 | Deuter | 714/57 |
| 2004/0130565 A1* | 7/2004 | Fujita et al. | 345/705 |
| 2005/0091611 A1* | 4/2005 | Colleran et al. | 715/804 |
| 2006/0031781 A1* | 2/2006 | Keohane et al. | 715/807 |
| 2006/0200702 A1* | 9/2006 | Canning et al. | 714/38 |
| 2007/0050769 A1* | 3/2007 | Switzer et al. | 718/100 |
| 2007/0074128 A1* | 3/2007 | Lim et al. | 715/764 |

* cited by examiner

SYSTEM AND METHOD FOR MONITORING APPLICATION RESPONSE AND PROVIDING VISUAL TREATMENT

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to tracking of application responsiveness and more specifically to improving the visual experience for a user by providing improved visual feedback.

BACKGROUND OF THE INVENTION

When interacting with a computer application, users may be confronted with a situation in which an application fails to appropriately respond. The application may appear to the user to be "hung" or non-responsive. Applications that appear to the user to be non-responsive may in some instances be legitimately non-responsive, but in other instances may simply fail to provide sufficient feedback to the user, when in fact the application remains operational.

In the Microsoft Windows operating system, produced by the Microsoft Corporation of Redmond Wash., applications that stop responding to messages sent by the operating system are classified as non-responsive. Other applications continue to respond to messages sent by the operating system but do not provide sufficient visual feedback to the users. As set forth above, both of these scenarios give users the impression that applications are hung.

Typically, operating systems have a mechanism for reacting to an application that is non-responsive. When the application fails to respond to messages sent by the operating system, the user can terminate the application through the operating system. A white space or ghosted screen typically appears in the window where the application was shown. Thus, visual treatments for non-responsive applications are not descriptive and do not provide sufficient visual feedback to the user.

Furthermore, no solution exists for tracking poorly behaved applications that, although they are responsive, provide insufficient visual feedback to users. A poorly behaved application may be sending messages to the operating system and receiving messages from the operating system, but fail to show a user prompt or dialog box in a manner that will appropriately alert the user that a response is required.

Accordingly, a solution is needed for determining whether an application is non-responsive or is merely awaiting user input. Furthermore a solution is needed for improving the visual treatment applied to application windows that are either non-responsive or that are operating normally but fail to provide a user with sufficient visual feedback to enable the user to continue working with the application. Furthermore, a solution is needed that enables a user to distinguish between a non-responsive and a poorly behaved application.

BRIEF SUMMARY OF THE INVENTION

Embodiments of the present invention are directed to a method for ensuring, from a computer operating system, that a responsive application is providing sufficient visual feedback to a user. The method includes determining whether the application is showing a dialog to the user and determining whether any shown dialog is visible to the user. The method additionally includes repositioning any dialog not visible to the user so that the repositioned dialog becomes visible to the user.

In an additional aspect of the invention, a method provides visual feedback to a user from a computer operating system to indicate non-responsive application status. The method includes determining a non-responsive application state by finding one of a ghosted application window and lack of an application dialog. The method further includes capturing an application window state and applying a visual treatment to each application window for the application using the captured application window state.

In yet a further aspect of the invention, a method for monitoring application status and responding with visual feedback from an operating system is provided. The method includes determining if an application window is ghosted and sending a message to an application if the application window is not ghosted. The method additionally includes waiting for a response from the application for a pre-set time period and determining whether the application is showing a dialog if the application provides a response within the pre-set time period. The method additionally includes applying a visual treatment to the application window if the application window is ghosted and applying a visual treatment if the application is not showing a dialog.

In yet a further aspect of the invention, a system is provided for monitoring application status and responding with visual feedback from an operating system. The system includes an application state monitoring component for determining whether an application is responsive, a window state capture component for capturing a state of a non-responsive application, and window appearance control components for altering an appearance of a non-responsive application window using the captured state.

In yet an additional aspect of the invention, a system is provided for monitoring application status and responding with visual feedback from an operating system. The system includes an application state monitoring component for determining whether an application is responsive and whether an application is showing a dialog. The system additionally includes a dialog manipulation component for re-positioning the dialog for a responsive application that provides a dialog that is not visible to the user. The system additionally includes window appearance control components for altering an appearance of a non-responsive application window.

BRIEF DESCRIPTION OF THE DRAWINGS

The present invention is described in detail below with reference to the attached drawings figures, wherein.

DETAILED DESCRIPTION OF THE INVENTION

I. System Overview

Figure 1:
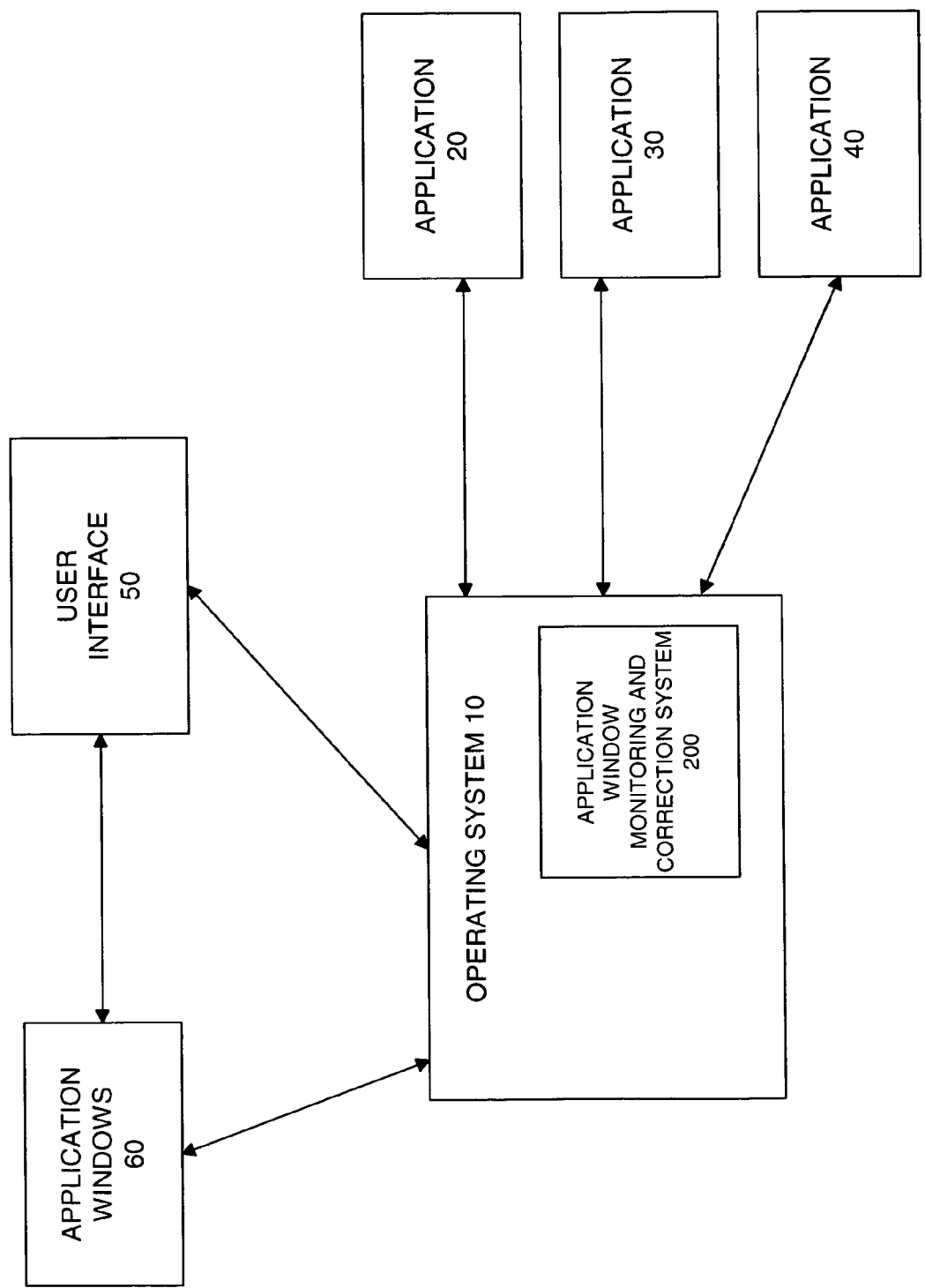
FIG. 1 is a block diagram illustrating an overview of a system in accordance with an embodiment of the invention.

Embodiments of the invention include a method and system for monitoring an application and providing suitable visual treatment in accordance with a hung or non-responsive application status. FIG. 1 illustrates a system including an operating system 10, applications 20, 30, 40, a user interface 50, and application windows 60. The operating system 10 includes an application window monitoring and correction system 200.

The application window monitoring and correction system 200 operates within the operating system 10 to monitor states of the applications 20, 30, and 40 and application windows 60. A user interacts with the operating system 10 and applications 20, 30, 40 through application windows 60 provided on the user interface 50.

The applications 20, 30, 40 may include any type of application including, but not limited to word processing applications, spreadsheet applications, Internet browsers, etc. The application window monitoring and correction system 200 may be included in any type of operating system including Microsoft Windows.

Figure 2:
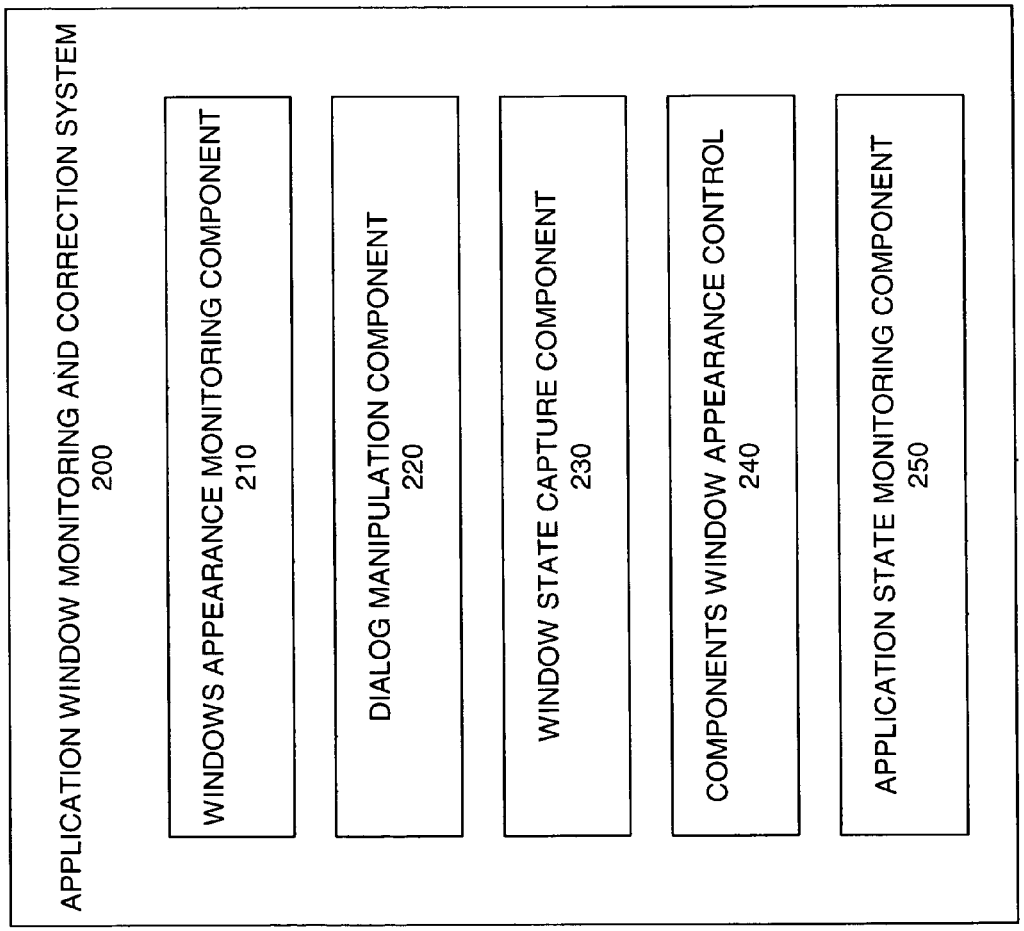
FIG. 2 is a block diagram illustrating components of an application window monitoring and correction system in accordance with an embodiment of the invention.

FIG. 2 illustrates an embodiment of the application window monitoring and correction system 200 in accordance with an embodiment of the invention. The monitoring and correction system 200 may include a window appearance monitoring component 210, a dialog manipulation component 220, a window state capture component 230, window appearance control components 240, and an application state monitoring component 250. In combination, these components determine the status of an application and alter the corresponding application window if necessary in order to convey information to the user and improve the user experience. Each of the components will be further described below in conjunction with a method of the invention.

The system and method of the invention allow visual treatment to be applied to a last active state of applications. The visual treatment is preferably in the form of a frosting. However, other visual treatments may also be utilized. Any of a number of visual treatments that will allow a user to distinguish a responsive application window from a non-responsive application window may be used.

The system and method further detect hidden dialogs that are shown in response to an application closing or exit request. The system and method additionally trap applications that respond to messages but ignore close commands and detect applications that do not provide visual feedback in response to user requests to close. Through these functions, a user is able to more readily distinguish between a non-responsive application and an improperly functioning application window.

II. Exemplary Operating Environment

Figure 3:
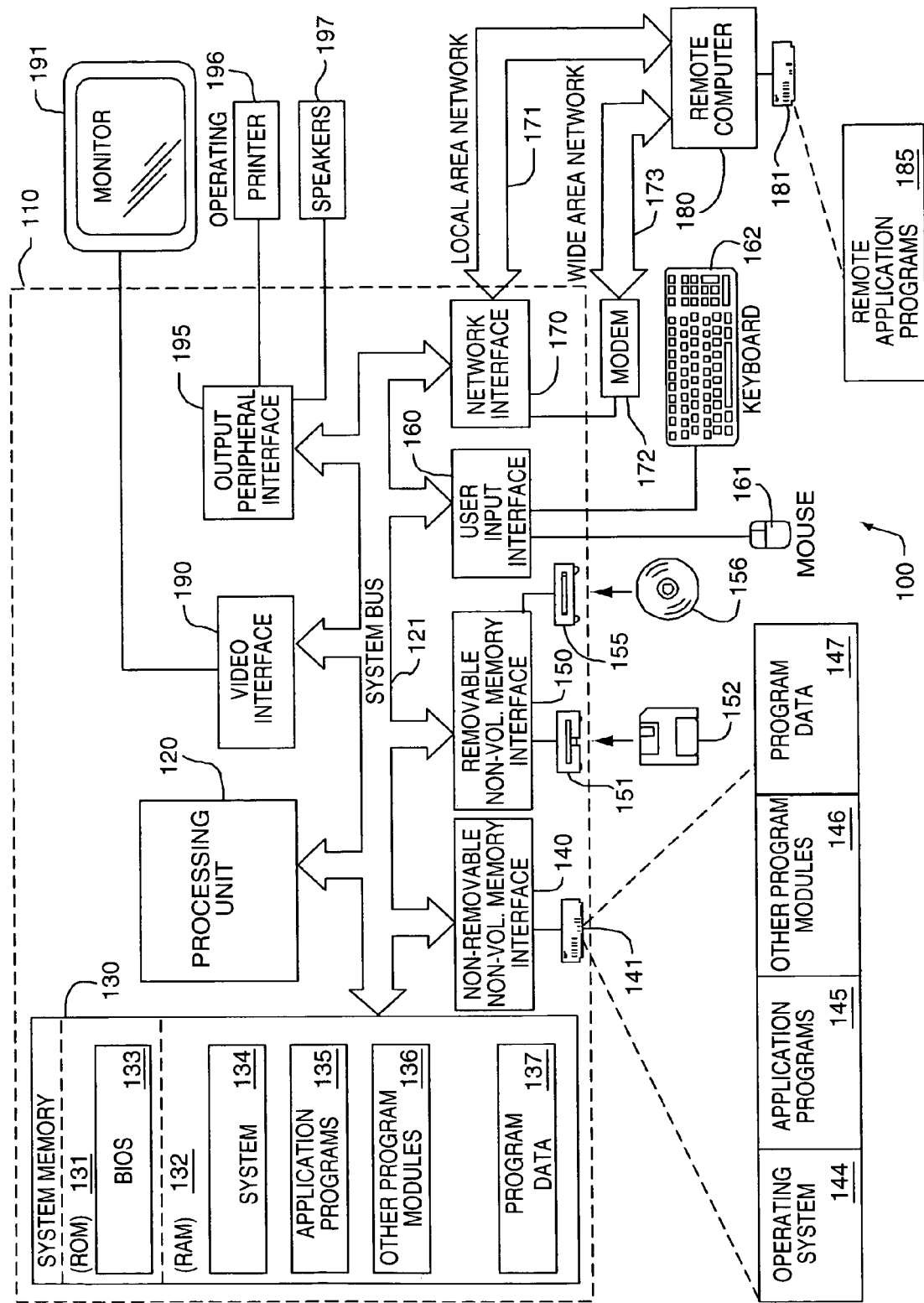
FIG. 3 is a block diagram illustrating a computerized environment in which embodiments of the invention may be implemented.

FIG. 3 illustrates an example of a suitable computing system environment 100 on which the application window monitoring and correction system 200 may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 3, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/nonremovable, volatile/nonvolatile computer storage media. By way of example only, FIG. 3 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIG. 2 illustrates the application window monitoring and correction system 200 in accordance with an embodiment of the invention. The application state monitoring component 250 determines whether an application is non-responsive or whether it is operating normally. The window appearance monitoring component 210 may assist in state determination by determining if a window is ghosted, thus indicating a non-responsive state. In cases in which the application is operational, but the user is not receiving sufficient information to continue utilizing the application, the dialog manipulation component 220 may move the dialog presented to the user to a visible location if the system determines that it has been hidden. In instances in which the application state monitoring component 250 determines that the application is non-responsive, the window state capture component 230 may capture the state of the application window in order to maintain it for user viewing. In both instances in which the application is responsive and non-responsive, the window appearance control components 240 may change the appearance of the application window as will be described below in conjunction with the method of the invention. In combination, these components determine the status of an application and alter the corresponding application window if necessary in order to convey information to the user and improve the user experience.

Figure 4:
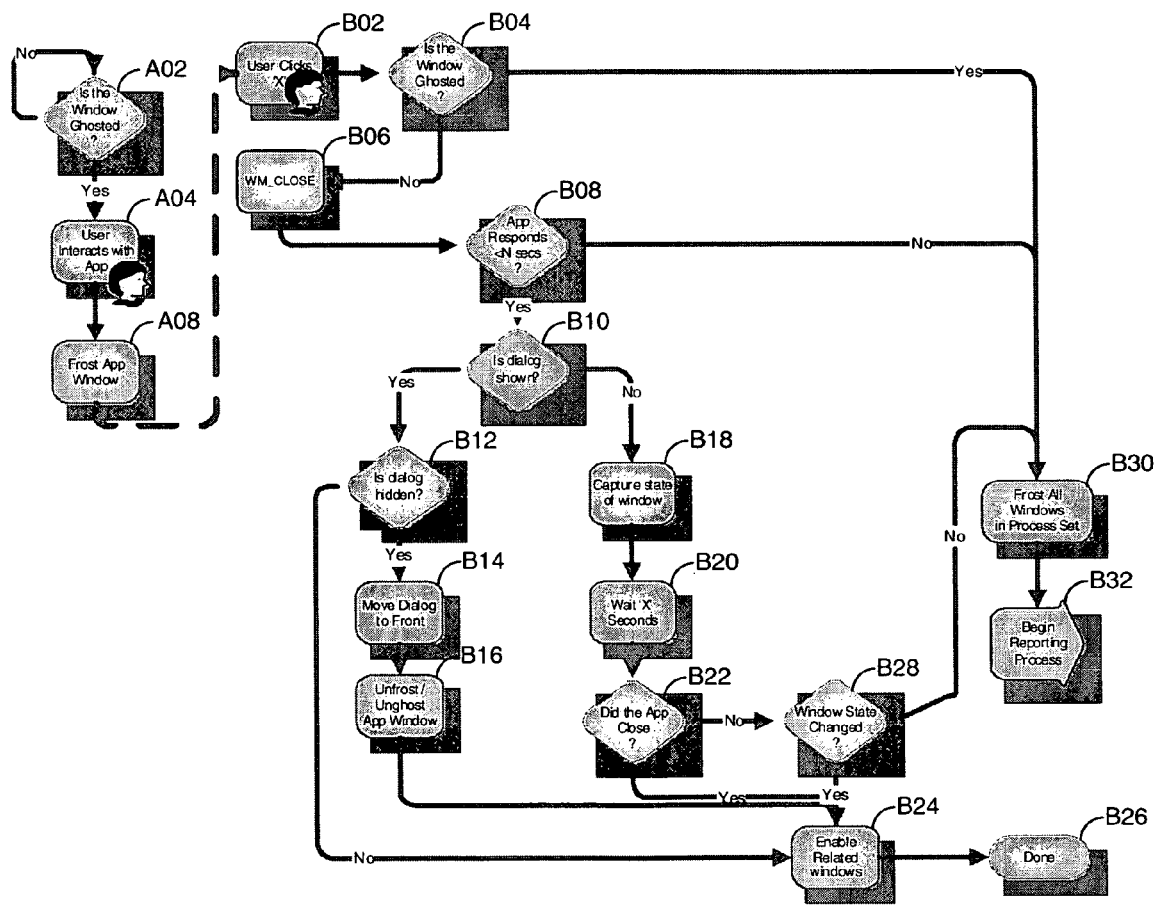
FIG. 4 is a flow chart illustrating monitoring and correction processes in accordance with an embodiment of the invention.

FIG. 4 is a flowchart illustrating a method in accordance with an embodiment of the invention. A first scenario, in which an operating system is aware that an application is non-responsive, is shown in steps A02-A08. A second scenario, in which the operating system is uncertain as to whether the application is non-responsive, is shown in steps B02-B32.

In the first scenario, the application window monitoring and correction system 200 monitors the application window to determine if the application window is a ghosted window. As explained above, a ghosted window is an effect that is typically shown when an application is not responding. The system knows that an application is not responding if the ghosted window is present. If the window is ghosted, the user interacts with the application in step A04, and the application window monitoring and correction system applies a visual treatment such as frosting to the application window in step A08 and offers an application termination dialog.

In the second scenario, after a user interacts with an application in step B02, the application window monitoring and correction system 200 determines if the application window is ghosted in step B04.

If the application window is ghosted in step B04, then the application is non-responsive and the process continues to step B30, in which the application window monitoring and correction system 200 applies a visual treatment such as frosting to all application windows in the process set. In step B32, the system begins the reporting process.

If the application window is not ghosted in step B04, the application window monitoring and correction system does not know if the application is healthy and accordingly takes steps to determine if the application is non-responsive. In step B06, the application monitoring and correction system sends "WM_Close" messages to the application to determine if application is healthy.

If the application does not respond within a pre-set threshold of "N" seconds in step B08, the system determines that the application is not responsive and begins to forcibly terminate the application. The system proceeds to step B30 to apply an appropriate visual treatment such as frosting to all windows in the process set.

Alternatively, if the application does respond within the pre-set time threshold in step B08, the system determines that since the application has responded, the application is healthy. Thereafter the system will determine whether the application has responded in an acceptable manner.

In step B10, the system determines if the application is showing a dialog. If the application is not showing the dialog in step B10, the system captures the state of the current window in step B18. After waiting a predetermined number of seconds in step B20, the system determines if the application closed in step B22. If the application does not provide any feedback to the user after a certain amount of time, the invention prompts the user to forcefully terminate, even though the application is still sending messages. If the application closed in step B22, the system enables related windows in step B4. If the application did not close in step B22, the system determines if the application changed its application window state in step B28. If the application did not change its application window state in step B28, the system applies the appropriate visual treatment, such as frosting, to all windows in the process set in step B30 and begins the reporting process in step B32. If the application did change its window state in step B28, the system enables related windows in step B24.

Returning to step B10, if the application is showing the dialog in step B10, the system examines whether the application shows a dialog that is visible to the user. The system determines whether the dialog is hidden in step B12. For instance, the dialog may be buried in the z-order and may not be visible on the user screen. If the dialog is not hidden in step B12, the application is behaving properly and all related windows are enabled in step B24. If the dialog is hidden in step B12, the system moves the dialog to a visible position for the user in step B14. In step B16, the system returns the window to its normal state by unfrosting or unghosting and the application proceeds to operate normally. All related windows are enabled in step B24 and the process is complete in step B26.

Figure 5A:
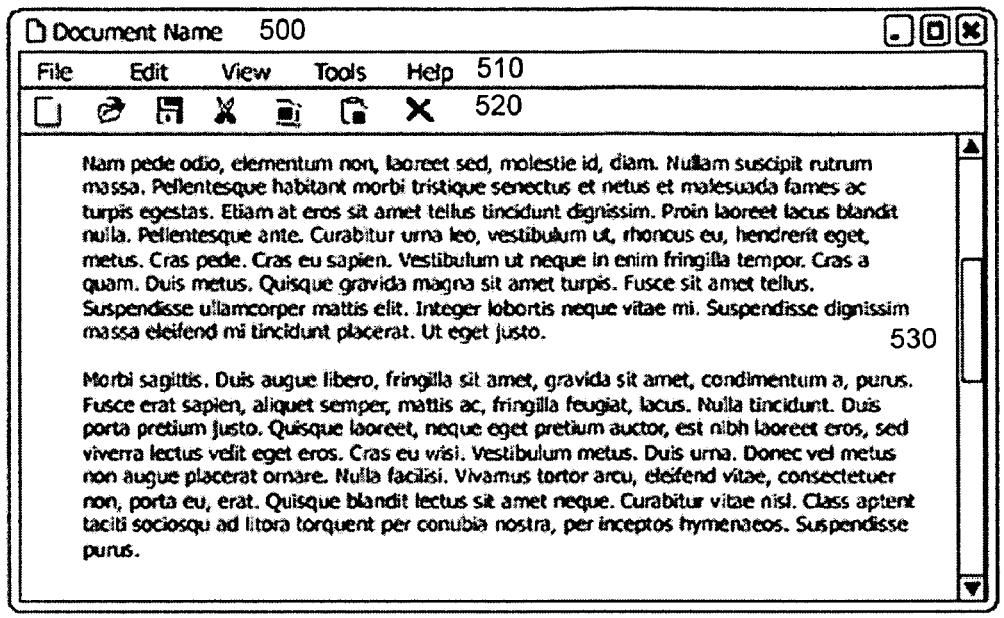
FIGS. 5A and 5B are screen shots illustrating a responsive application window in comparison with a non-responsive application window in accordance with an embodiment of the invention.
Figure 5B:
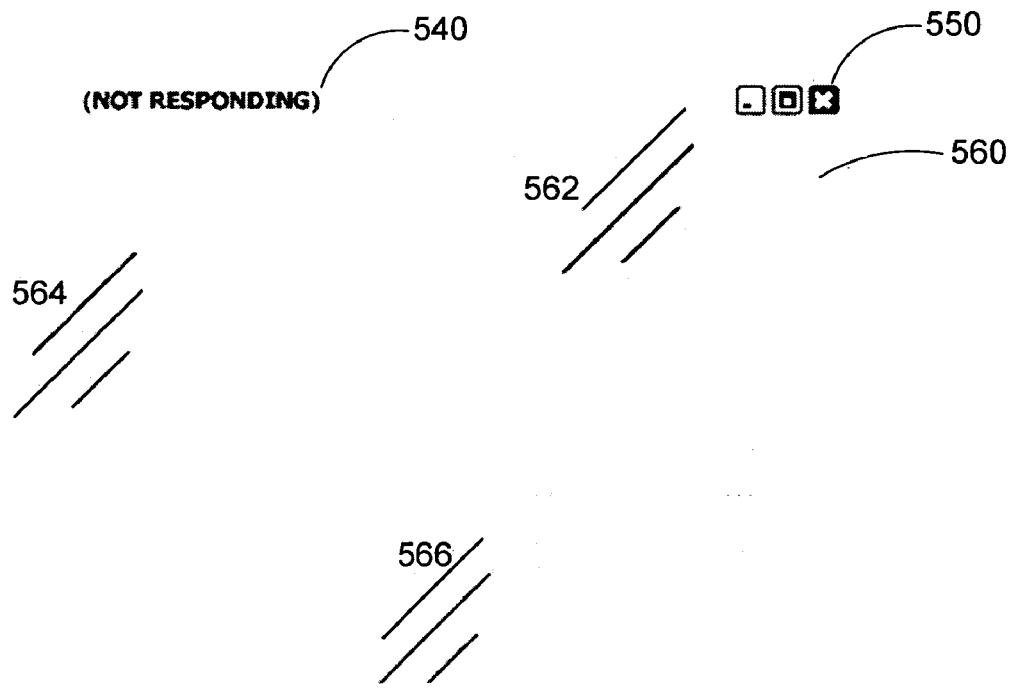

FIG. 5A is a screen shot showing a responsive application window having a title bar 500, a menu 510, a tool bar 520, and a display portion 530. FIG. 5B illustrates the same application window in a non-responsive state. In the title bar, a non-responsive indicator 540 is provided. Furthermore, to prompt the user, a highlighted close button 550 is provided. A display portion 560 is lightened so that it appears disabled. Furthermore, random frost bitmaps 562, 564, and 566 are distributed across the window.

The application window shows a bitmap that replaces a hole in an application that would normally appear when an application ceases to respond. When applications become non-responsive, the last active visual representation for those application windows is captured and superimposed with a visual treatment thus identifying those windows as non-responsive.

The visual treatment referred to as "frosting" can be accomplished using a series of steps. These steps include boosting RGB values and alpha blending them with captured windows. The frosting process may then segment captured windows into sections. One or more stored frosting bitmaps may then be combined through a randomization function to distribute frosting bitmaps. The process then superimposes a frosted window with a saturated application window.

Figure 6:
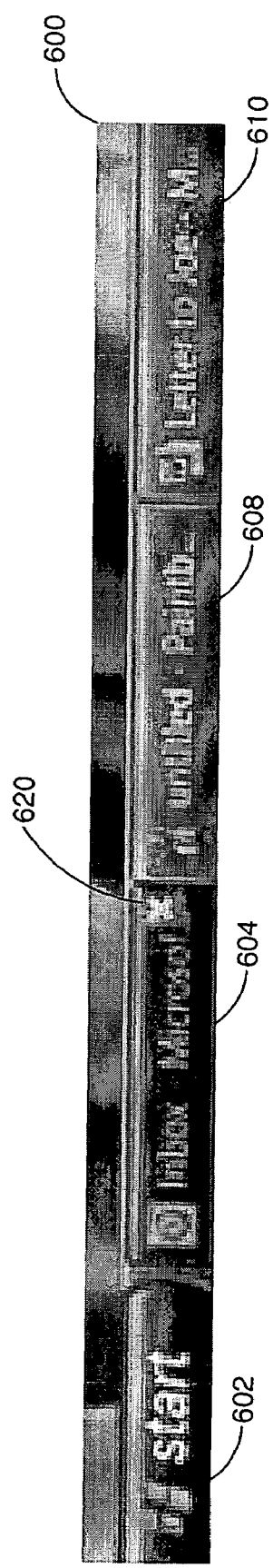
FIG. 6 illustrates a task bar in accordance with an embodiment of the invention.

FIG. 6 illustrates a task bar 600 including a start button 602 and a plurality of minimized applications 604, 608, and 610. The task bar further includes an "X" that allows the user to close an application. This "X" may be supplied when the window is not visible to the user and is buried in the z-order. Users often use taskbar icons to access a window and some applications do not have a standard window frame with a close button. When one of these applications becomes non-responsive, users have no capability to terminate the application. Accordingly, provision of an "X" on the taskbar provides users with a termination tool.

In summary, the system of the invention determines if an application is non-responsive and applies a visual treatment to non-responsive application windows in order to give better feedback to computer users. The system also traps poorly behaved applications that respond to messages from the operating system but do not provide UI feedback to the user.

The system and method of the invention provide a highly visible technique for identifying and displaying non-responsive applications. Non-responsive applications are a frequent problem for computer users and this technique will allow operating systems to provide a better user experience for the non-responsive application problem. The technique for detecting poorly behaved applications addresses new classes of scenarios that other operating systems currently overlook. Prevention of data loss occurs by notifying user that an application that appears to be hung is actually still responsive.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope. From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method for ensuring from a computer operating system that a responsive application is providing visual feedback to a user, the method comprising:
   determining that an application window appears non-responsive by capturing a window state and determining that the window state is ghosted;
   determining that the application window is operational;
   determining that there is a dialog associated with the application window and that the dialog is not visible to the user;
   repositioning the dialog so that the repositioned dialog becomes visible and is presented to the user in a way that the user can interact with the dialog, enabling the user to interact with the application window even though the application appears non-responsive.

2. The method of claim 1, further comprising, upon determining that no dialog is shown and waiting for a predetermined time period for the application to close, providing feedback to inform the user that the application is non-responsive and prompting the user to terminate the application.

3. The method of claim 1, further comprising determining that a shown dialog is buried and moving the dialog to a front position visible to the user.

4. The method of claim 3, further comprising altering the application window appearance after revealing the hidden dialog.

5. The method of claim 4, wherein altering the application window appearance comprises one of removing a frosting effect and removing a ghosting effect from the application window.

6. A computer storage medium having instructions embodied thereon that, when executed, performs the method of claim 1.

7. A method for providing visual feedback to a user from a computer operating system to indicate application status, the method comprising:
- determining whether an application is responsive or non-responsive by capturing a window state and determining that the application is non-responsive where the window state is ghosted and that the application is responsive where the window state is not ghosted;
- if the application is non-responsive:
  - (i) capturing an application window state; and
  - (ii) applying a visual treatment to each application window for the application using the captured application window state to indicate the non-responsive application state to the user;
- if the application is responsive:
  - (i) determining that there is a dialog associated with the application window that is not visible to the user; and
  - (ii) repositioning the dialog so that the repositioned dialog becomes visible and is presented to the user in a way that the user can interact with the dialog, enabling the user to interact with the application window even though the application appears non-responsive.

8. The method of claim 7, further comprising applying a visual treatment by frosting each application window.

9. The method of claim 7, further comprising locating an application dialog and determining that an application is responsive.

10. The method of claim 9, further comprising determining that the dialog is hidden from the user.

11. The method of claim 10, further comprising re-positioning the hidden dialog to make it visible to the user.

12. The method of claim 11, further comprising altering the application window appearance after revealing the hidden dialog.

13. The method of claim 12, wherein altering the application window appearance comprises one of removing a frosting effect and removing a ghosting effect from the application window.

14. A computer storage medium having instructions embodied thereon that, when executed, performs the method of claim 7.

15. A method for monitoring application status and responding with visual feedback from an operating system, the method comprising:
- determining that an application window is responsive by capturing a window state and determining that the window state is not ghosted;
- sending a message to an application;
- waiting for a response from the application for a pre-set time period;
- determining that the application is showing a dialog; and
- repositioning the dialog so that the repositioned dialog becomes visible and is presented to the user in a way that the user can interact with the dialog, enabling the user to interact with the application window even though the application appears non-responsive.

16. The method of claim 15, further comprising locating an application dialog and determining that an application is responsive.

17. The method of claim 16, further comprising determining that the dialog is hidden from the user.

18. The method of claim 17, further comprising re-positioning the hidden dialog to make it visible to the user.

19. The method of claim 17, further comprising altering the application window appearance after revealing the hidden dialog.

20. The method of claim 19, wherein altering the application window appearance comprises one of removing a frosting effect and removing a ghosting effect from the application window.

21. A computer storage medium having instructions embodied thereon that, when executed, performs the method of claim 15.

22. A system having computer readable storage media for monitoring application status and responding with visual feedback from an operating system, the system executed by a processor comprising:
- An application state monitoring component, executed by the processor, for determining that an application is responsive and that an application is showing a dialog;
- A dialog manipulation component, executed by the processor, for repositioning the dialog for a responsive application where the dialog is positioned in a way that the user cannot interact with the dialog, and where the repositioned dialog is presented to the user and positioned in a way that the user can interact with the dialog, enabling the user to interact with the application window even though the application appears non-responsive, and;
- One or more window appearance control components, executed by the processor, for altering the appearance of a non-responsive application window to indicate application status to the user.

23. The system of claim 22, further comprising a window state capture component for capturing an application window state for a non-responsive application.

24. The system of claim 22, further comprising a window appearance monitoring component for detecting at least one of a ghosted window and a frosted window.

* * * * *